(12) United States Patent
Vervisch et al.

(10) Patent No.: US 10,422,894 B2
(45) Date of Patent: Sep. 24, 2019

(54) DETECTOR IRRADIATED WITH NUCLEAR POWER

(71) Applicants: UNIVERSITE D'AIX MARSEILLE, Marseilles (FR); CENTRE NATIONAL DE LA RECHERCHE SCIENTIFIQUE (CNRS), Paris (FR)

(72) Inventors: Wilfried Vivian Roland Vervisch, Lancon de Provence (FR); Vanessa Laurence Jill Vervisch Ep Hurtado, Marseilles (FR); Stéphane Biondo, Allauch (FR); Laurent James Ottaviani, Marseilles (FR)

(73) Assignees: UNIVERSITE D'AIX MARSEILLE, Marseilles (FR); CENTRE NATIONAL DE LA RECHERCHE SCIENTIFIQUE (CNRS), Paris (FR)

( * ) Notice: Subject to any disclaimer, the term of this patent is extended or adjusted under 35 U.S.C. 154(b) by 0 days.

(21) Appl. No.: 15/745,287

(22) PCT Filed: Jul. 15, 2016

(86) PCT No.: PCT/EP2016/066887
§ 371 (c)(1),
(2) Date: Jan. 16, 2018

(87) PCT Pub. No.: WO2017/013006
PCT Pub. Date: Jan. 26, 2017

(65) Prior Publication Data
US 2019/0004192 A1  Jan. 3, 2019

(30) Foreign Application Priority Data

Jul. 17, 2015 (FR) ...................... 15 56765

(51) Int. Cl.
*G01T 1/00* (2006.01)
*G01T 1/24* (2006.01)
*G01D 11/24* (2006.01)

(52) U.S. Cl.
CPC ............ *G01T 1/244* (2013.01); *G01D 11/245* (2013.01); *G01T 1/241* (2013.01)

(58) Field of Classification Search
CPC  G01T 1/24; G01T 1/241; G01T 1/242; G01T 1/246; G01T 1/249
See application file for complete search history.

(56) References Cited

U.S. PATENT DOCUMENTS 3,013,156 A * 12/1961 Hearn ...................... G01V 5/04
174/521
4,393,025 A *  7/1983 Leyse ................... G21C 17/112
376/247

(Continued)

FOREIGN PATENT DOCUMENTS

FR        3030781 A1      6/2016
WO   WO 2013/002697 A1   1/2013

OTHER PUBLICATIONS

International Search Report as issued in International Patent Application No. PCT/EP2016/066887, dated Sep. 30, 2016.

*Primary Examiner* — David P Porta
*Assistant Examiner* — Mamadou Faye
(74) *Attorney, Agent, or Firm* — Pillsbury Winthrop Shaw Pittman LLP

(57) ABSTRACT

A radiation detector to be irradiated with nuclear particles, includes an electrical connection system including an anode and a cathode; a metal housing, inside of which at least one portion of the electrical connection system is positioned; a semi-conductor sensor including a first electrical circuit, the sensor being encapsulated in the housing; and an attachment system for attaching the sensor to the housing, the attach- (Continued)

ment system including an electrically conductive material, at least one portion of the attachment system being connected to the anode of the electrical connection system and being removably linked to the sensor, at least one second portion of the attachment system being linked to the cathode of the electrical connection system and being removably linked to the sensor.

14 Claims, 7 Drawing Sheets

(56) References Cited

U.S. PATENT DOCUMENTS

| 2005/0056791 A1* | 3/2005 | Donaghue | G01T 1/244 |
| | | | 250/394 |
| 2011/0233421 A1* | 9/2011 | Thurston | G01T 1/161 |
| | | | 250/393 |

* cited by examiner

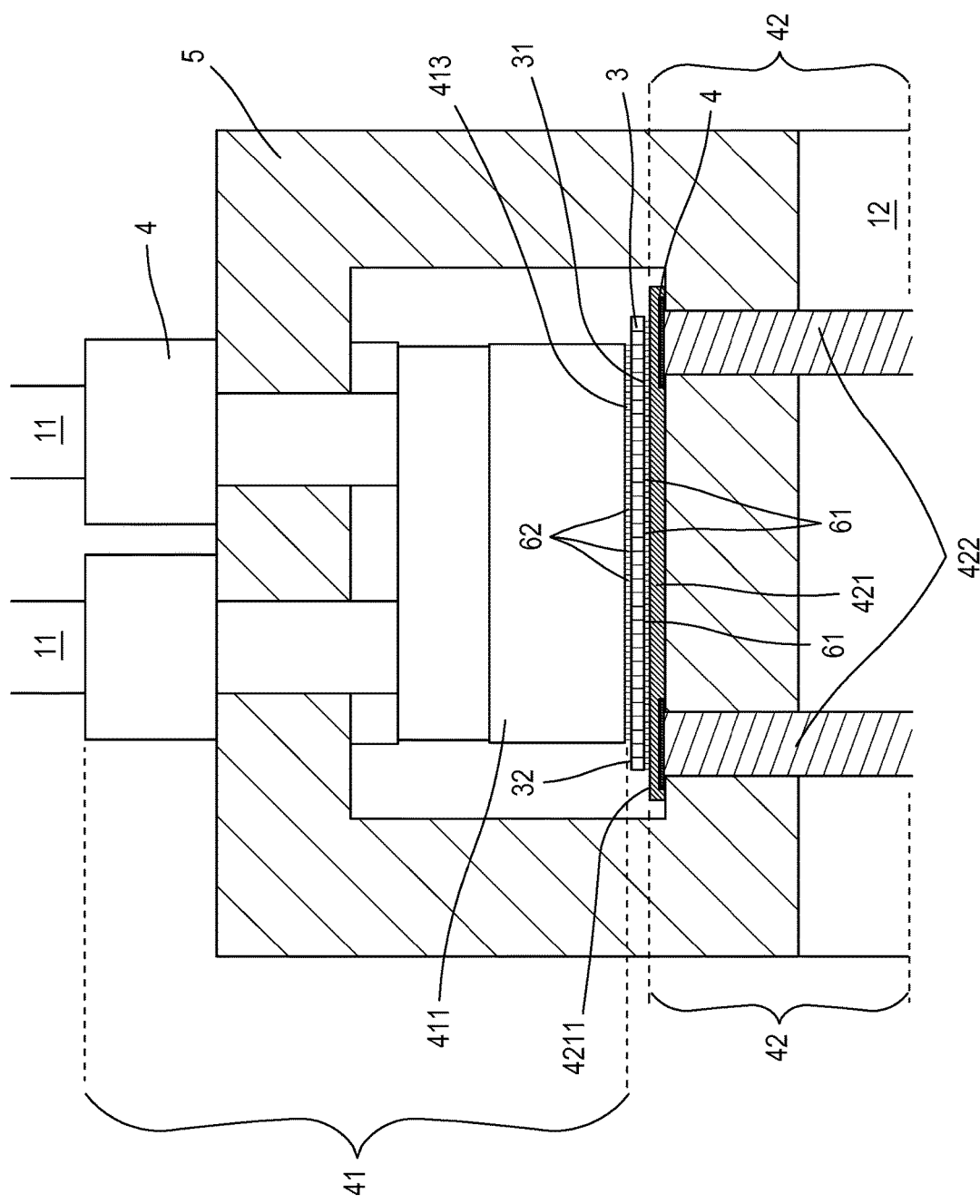

DETECTOR IRRADIATED WITH NUCLEAR POWER

CROSS-REFERENCE TO RELATED APPLICATIONS

This is the U.S. National Stage of PCT/EP2016/066887, filed Jul. 15, 2016, which in turn claims priority to French Patent Application No. 1556765, filed Jul. 17, 2015, the entire contents of all applications are incorporated herein by reference in their entireties.

TECHNICAL FIELD OF THE INVENTION

The invention relates to a detector irradiated with nuclear particles, preferably for the detection of particles in a specific environment, i.e. under irradiation subjected to high temperatures, severe conditions (pressure, corrosive surroundings). Such a detector has two types of potential applications: one qualitative, the selectivity of particles, but also quantitative, energy deposition measurement, i.e. dosimetry.

PRIOR ART

At the present moment in time, the great majority of detectors irradiated with nuclear particles are in the form of scintillators or ionisation chambers. They are not constituted of a sensor based on semi-conductor, such as silicon carbide. At the laboratory scale, sensors exist equipped with a protective housing requiring a metal material in order that it encapsulates the sensor collecting the electrical signal. The electrical signal is thereby free of all perturbations thanks to the metal housing which plays the role of Faraday cage, but also of leak tight protection of the sensor vis-à-vis the environment in which it is used (immersed, under pressure, etc.). Moreover, a sensor based on silicon carbide, unlike silicon (base material for semi-conductor sensors) has the advantage of being able to work in a severe environment, for example at high temperature (on average above 200° C.) or in an environment inducing high risks of corrosion.

The semi-conductor sensor must comprise electrical contacts that make it possible to make the electrical signal transit from an electrical circuit of the sensor to the outside of the detector. At present, the electrical contacts are exclusively formed by means of welding. In the case of operation in an environment under very high temperature, that is to say above 200° C., the electrical contacts formed by welding cannot withstand, or can withstand over a very reduced time lapse, exposure to such temperatures. Moreover, when humidity is added to such a temperature (for example during oil well drilling), the electrical contacts suffer the negative effects of corrosion.

DESCRIPTION OF THE INVENTION

The invention aims to overcome all or part of the drawbacks of the prior art identified above, and notably to propose a detector irradiated with nuclear particles able to withstand very high temperatures, that is to say generally above 500° C., or even 600° C.

To this end, one aspect of the invention relates to a detector being irradiated with nuclear particles comprising:

- an electrical connection means comprising a first portion, referred to as an anode, and a second portion, referred to as a cathode;
- a metal housing inside of which at least one portion of said electrical connection means is positioned;
- a semi-conductor sensor comprising a first electrical circuit, said sensor being encapsulated in the housing; and
- a means of attaching the sensor to the housing, said attachment means comprising an electrically conductive material, at least one first portion of the attachment means being connected to the anode of the electrical connection means and being removably linked to said sensor, at least one second portion of the attachment means being connected to the cathode of the electrical connection means and being removably linked to said sensor.

The electrical circuit of the sensor is connected to an electrical connection means comprising an anode and a cathode of the housing in order to be able to convoy the electrical information of the sensor to the outside of the housing via the electrical connection means. Thus, for example the electrical information may be sent to an amplification circuit, to a current-voltage converter, to a digital/analogue reader, or any other means of processing the signal. Indeed, it is the electrical properties of the semi-conductor that vary in the event of exposure to nuclear particles and this variation results in an evolution of the electrical information of the electrical circuit of the sensor as a function of the particles collected by the semi-conductor. Indeed, the sensor plays the role of a power generator (voltage, current). When it collects the particles, said particles cause the generation of charge carriers which results in an electrical signal in the form of current. The use of a sensor based on semi-conductor, such as silicon carbide or diamond or gallium nitride, during the detection of the presence of nuclear particles in an environment at high temperatures is particularly suited. Moreover, it enables miniaturisation as well as increased detection rapidity, Such a type of semi-conductor sensor is described in the patent application FR14/63019 or instead in the international patent application WO 2013/002697.

The detector according to the invention can thereby withstand high (above 200° C.), or even very high (above 400° C.) temperatures on account of the presence of the attachment means which comprise a first and a second portion removably linked to the sensor. It is obviously understood that the formation of a link by means of a weld is not a removable link and does not make it possible to attach two components in a removable manner. Moreover, an attachment/link by means of a weld does not withstand high temperatures. Indeed, the average minimum melting temperature of a weld is currently of the order of 100° C. The melting temperature of a weld is a function of the melting temperature of the metal during the very localised brazing between the metal and the first metal contact layer above the semi-conductor. However, this temperature has to be well above the temperature of use of the detector, which causes an unequivocal degradation of the sensor. In addition, at the present time in technical terms, this very precise and wry localised welding is a real technological obstacle. The detector according to the invention can thereby withstand use at high temperature, but also with a high humidity level. Indeed, the different electrical components of the detector, namely: anode, cathode, electrical circuit of the sensor are connected to each other by removable link by an electrically conductive material in a mechanical manner. The attachment means enable the holding and the electrical connection of the sensor within the housing.

The metal housing preferentially comprises as metal material Z30C60 or titanium or any metal alloy that can withstand extreme temperatures, i.e. above 500° C. The function of the housing is to encapsulate the sensor that collects an electrical signal. On account of the encapsulation of the sensor by the housing, the electrical signal is free of electrical, or electromagnetic, perturbations because the housing plays a role of Faraday cage. Moreover, the encapsulation makes it possible to protect the sensor from aggressions of the environment, outside of the housing.

The housing may be of any shape if the shape of the housing makes it possible to hug a cramped medium efficiently. For example, housings of cubic shape of less than three centimeter sides may be made for geoprospection or applied geophysics. The housings are adaptable as a function of the situation in which they are intended to be used. Thus, for nuclear reactor cores, they could be of cylindrical shape. In order to have maximum impact resistance, they could be of spherical shape. Spherical or cylindrical shapes are particularly well suited to ensuring leak tightness of the detector. Indeed, the screwing of a cylindrical, or spherical housing is more leak tight than the screwing of a cubic-shaped housing. Indeed, a circular ring is more leak tight than a square ring. Thus, the housing preferentially comprises two portions, a first portion encompassing at least one portion of a second portion, the two portions being attached to each other by means of a screwing ring type component.

Apart from the main characteristics that have just been mentioned in the preceding paragraph, the detector according to the invention may have one or more additional characteristics among the following, considered individually or according to all technically possible combinations thereof.

Advantageously, the first portion of the attachment means is linked in a removable manner to the anode of the electrical connection means and the second portion of the attachment means is linked in a removable manner to the cathode of the electrical connection means. It is obviously understood that the formation of a link by means of a weld is not a removable link and does not make it possible to attach two components in a removable manner.

Advantageously, the second portion of the attachment means comprises a first metal support connected to the cathode, a first surface of the sensor being in contact with a first surface of the first support, and the first portion of the attachment means comprises a moveable component between:
  a first position in which it exerts a mechanical pressure on a second surface of the sensor in such a way that the sensor is maintained in position between the metal support and the moveable component; and
  a second position in which it does not exert mechanical pressure on the sensor. Thus, in addition to being removable, the link between the second portion of the attachment means and the sensor is moveable. In the second position, the circuit is open between the sensor and the anode, thus no current can flow and the electrical information of the sensor cannot be transmitted to the anode, and potentially to the outside of the housing. In the first position, the circuit is closed. All the components in contact and/or removably linked are electrical conductors, which makes it possible to ensure the transition of an electric current there through. Moreover, the first position has the interest of being able to insert the sensor into its compartment during the manufacture or the change of the sensor at the end of the lifetime of the semi-conductor while retaining the encapsulation metal housing.

Advantageously, the first surface of the first support comprises a first bundle of short metal spikes and in that the moveable component comprises a first portion, said first portion being adapted to be in contact with the second surface of the sensor in the first position of the moveable component, said first portion comprising a second bundle of short metal spikes. The first and second bundles of short metal spikes may be similar to the spikes on a bed of nails. Their function is to limit improper roughness between the contact surfaces of the different components that can alter the electrical conduction. The metal spikes are preferentially spaced apart by several hundreds of microns or even tens of microns or less according to the efficiency of the metal engraving tool. The metal spikes make it possible to obtain a multitude of pressure contacts behaving like resistors in parallel, and thus improving the conductivity.

Advantageously, the first metal support is flexible which makes it possible to reduce mechanical stresses during the passage of the moveable component from the first position to the second position.

Advantageously, the detector comprises a ceramic component, said component being arranged in the housing in such a way as to electrically insulate the anode from the cathode. The ceramic component enables electrical insulation between the anode and the cathode, and does so even at very high temperature.

In a particularly advantageous manner, the ceramic component is a ceramic ring arranged in the sensor in such a way as to surround the first metal support. The fact that the first metal support is surrounded by the ceramic ring makes it possible to ensure good mechanical stability of the first support, and thus of the sensor to which it is connected, as well as a robustness to potential impacts, while ensuring good electrical insulation of the components.

In a particularly advantageous manner, the metal material constituting the housing is chosen to play a role of filter of nuclear particles. Thus, for example, a sizeable lead jacket can absorb X-rays, a cadmium jacket will stop thermal neutrons, etc.

In a particularly advantageous manner, the housing of the detector comprises a first gas. The first gas may thus play a role of filter or moderator and thus participate in the transformation of particles that have come From the outside of the housing. For example, hydrogen or methane slow down rapid neutrons.

In a particularly advantageous manner, the housing comprises a first plug for supplying gas inside the housing and a second plug for purging the gas. The first plug enables the introduction of gas inside the housing. The second plug makes it possible to empty the inside of the housing of gas. All of this corresponds to a system for purging the housing.

In a particularly advantageous manner, the housing comprises:
  a first face, said first face comprising at least one first male socket, said first male socket comprising a first end housed inside the housing connected to the anode of said detector and a second end adapted to cooperate with a Female socket of another additional detector of said first male socket;
  a second face, said second face comprising at least one first female socket, said first female socket comprising a first end housed inside the housing and connected to the first male socket of the first face of said detector and a second end adapted to cooperate with a male socket of another additional detector of said first female socket.

The presence of a first male socket and a first female socket enables the electrical interconnection of several detectors together and thereby to make the electrical information transit between detectors. Thus, it is possible to connect several detectors together, like wagons of a train. A function of filtering a type of particles in particular, different from the other types of particles that can be detected by the other sensors of other detectors, could thus be associated with a detector. This filtering function takes place for example as a function of the gas inside the housing, or instead the type of metal constituting said housing, or the type of semi-conductor sensor formed. The assembly of these detectors makes it possible to obtain a complete system for reading particles in this form of pixellation.

In a particularly advantageous manner, the first face of the housing comprises a first screw pitch that can cooperate with a second threading of a face of another detector; and the second face of the housing comprises a first threading that can cooperate with a second screw pitch of another detector. This makes it possible to ensure that the male and female sockets of a housing are free in rotational movement, which makes it possible to screw the detectors, via their housings, to each other.

The invention also relates to an assembly for the detection of irradiated nuclear particles, said assembly comprising a first detector according to one of the embodiments described previously, a second detector according to one of the embodiments described previously, said first detector comprising one face comprising a male socket, said male socket comprising one end housed inside the housing and connected to the anode of said first detector and a second end adapted to cooperate with a first female socket of the second additional detector of the male socket; said second detector comprising:
- a second face comprising a female socket, said female socket of the second detector comprising one end housed inside the housing and connected to a male socket of one face of said second detector and a second end adapted to cooperate with the male socket of the first detector;
- a first face comprising:
    - a male socket, said male socket comprising one end housed inside the housing and connected to the female socket of the second face of said second detector and a second end adapted to cooperate with a first female socket of the second additional detector of the male socket;
    - a second male socket, said second male socket comprising one end housed inside the housing and connected to the anode of said second detector and a second end adapted to cooperate with a female socket of a third additional detector of the second male socket of the second detector.

In a particularly advantageous manner, the housing of the first detector comprises a first gas and the housing of the second detector comprises a second gas.

The invention also relates to a system for the detection of irradiated nuclear particles, said system comprising: a detector according to one of the previously described embodiments, a first jacket comprising ceramic encompassing said detector, a second jacket comprising ceramic encompassing said first jacket in such a way that a space exists between the first jacket and the second jacket, said space comprising a layer comprising a first metal. The first jacket and the second jacket comprising the ceramic play a role of thermal insulation in order to protect the detector, as well as the first metal, from high or even wry high temperatures.

In a particularly advantageous manner, the first metal is cadmium. Cadmium plays a role of converter and makes it possible to get away from the influence of thermal neutrons in order to only let gamma particles pass inside the housing.

BRIEF DESCRIPTION OF THE FIGURES

Other characteristics and advantages of the invention will become clear from reading the description that follows, with reference to the appended figures, which illustrate:

FIG. 2, a schematic sectional view along the width of the detector of FIG. 1;

For greater clarity, identical or similar components are marked by identical reference signs in all of the figures.

DETAILED DESCRIPTION OF ONE EMBODIMENT

Figure 1:
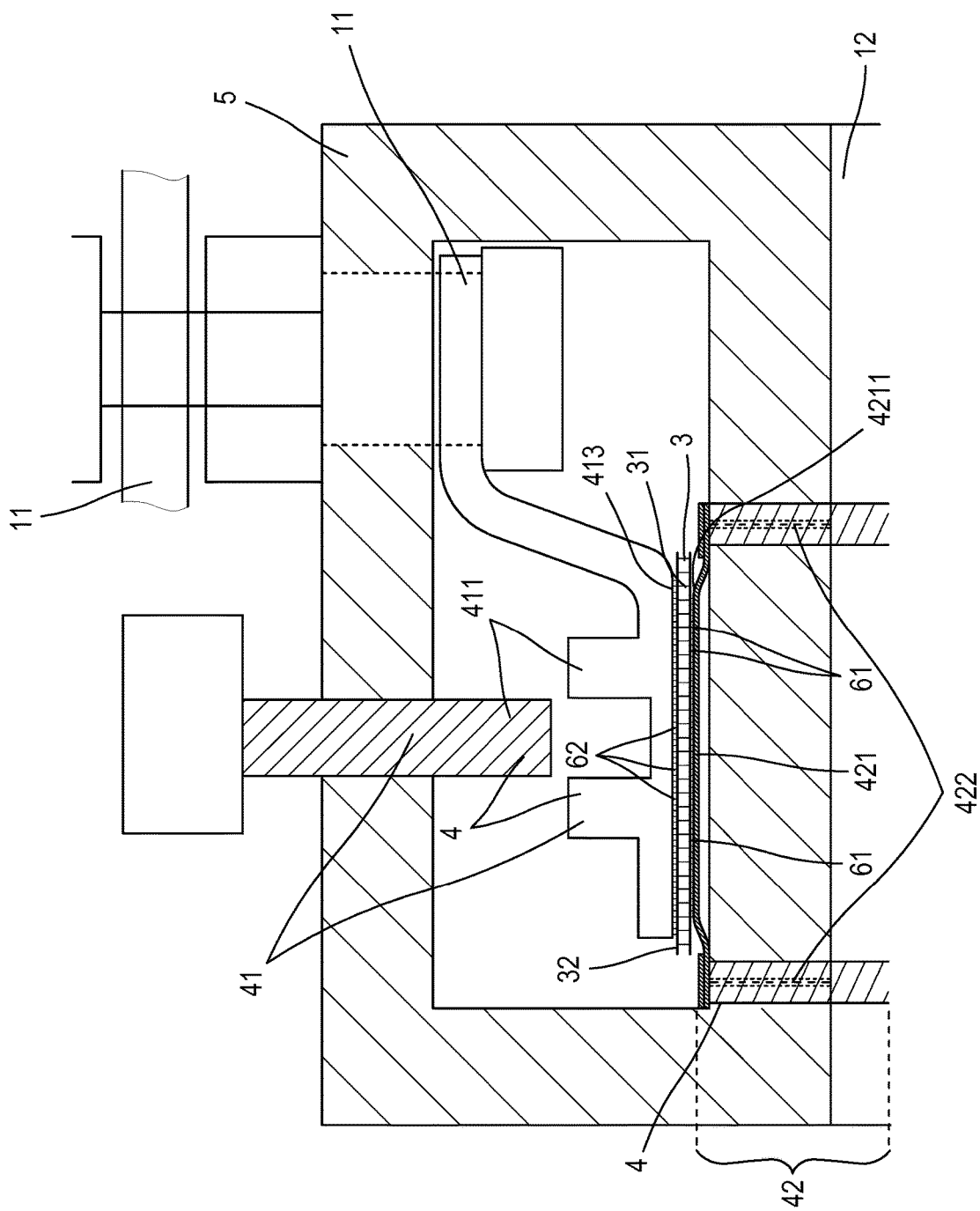
FIG. 1, a schematic sectional view along the length of a detector according to a first embodiment of the invention.

FIGS. 1 (sectional lengthwise view) and 2 (sectional widthwise view) of the detector highlight an electrical connection means comprising a first portion 11, referred to as an anode and a second portion 12, referred to as a cathode. The housing of each of the detectors is not very visible in FIGS. 1 and 2 (portion 12). Only the inside of these housings are mainly visible.

The detector of FIGS. 1 and 2 likewise comprises a semi-conductor sensor 3 comprising a first electrical circuit and encapsulated in the housing. The detector of FIGS. 1 and 2 also shows an attachment means 4 comprising an electrically conductive material, copper, aluminium for example. A first portion 41 of the attachment means is connected to the anode 11 of the electrical connection means and is removably linked to the sensor 3. A second portion 42 of the attachment means is connected to the cathode 12 of the electrical connection means and is removably linked to said sensor. The second portion of the attachment means comprises a first metal support 421, made of copper for example, connected to the cathode 12 by means of screws 422 and in removable contact with a first surface 31 of the sensor.

In the example of FIG. 1, as in FIG. 2, the screws are made of metal. It is the portion 5 which insulates the whole and is constituted of ceramic. In the example of FIGS. 1 and 2, the screws are made of electrically conductive material and directly form the electrical connection between the support and the cathode 12.

The first portion of the attachment means comprises a component 411 that can mow between:
- a first position (visible in FIG. 1) in which it exerts a mechanical pressure on a second surface 32 of the sensor in such a way that the sensor is maintained in position between the first metal support and the moveable component. It can clearly be seen in FIG. 2 that the sensor is as though sandwiched between the moveable component and the first metal support; and
- a second position (not visible), in which it does not exert mechanical pressure on the sensor. It may well be imagined that the moveable component, of the type screw+F-shaped component, 411 of FIG. 1 is in position in FIG. 1 because the F-shaped component exerts a mechanical pressure thanks to its pre-stressed shape. It is precisely the F shape that exerts the pressure, the position without pressure on the sensor is achieved when the screw comes to trap the F shape and raise it by the fact of screwing said part.

In FIGS. 1 and 2, it may be seen that the first surface 4211 of the first support comprises a first bundle of short metal spikes 61 and the moveable component comprises a first portion 413 adapted to be in contact (contact visible in the first position, visible in FIG. 1) with the second surface 32 of the sensor in the first position of the moveable component. This first portion 413 comprises a second bundle of metal spikes 62. The first and the second bundles make it possible to ensure an electrical, and mechanical, contact on account of their electrically conducting character, between the sensor and the components between which it is maintained in sandwich position in the first position of the mineable component, without taking account of potential surface disparities.

In FIGS. 1 and 2 may be seen a ceramic component 5. The ceramic component 5 plays a role of electrical insulator between the anode portion 11 of the electrical connection means and the cathode portion 12 of the encapsulation housing. It can be seen in FIGS. 1 and 2 that the ceramic component 5 has a ring shape surrounding the sensor and the first metal support.

The moveable component illustrated in FIG. 1 comprises a screw and an F-shaped component. The F-shaped component is moveable in such a way as to come to rest against the sensor and the screw is translationally moveable in such a way as to pick up the F-shaped component in order to ensure a replacement of the sensor. It is essential to underline that the screw of the system 411 does not rest on the F shape and thus on the sensor. The anode cathode contacts through metal contacts 411 and 421 certainly have to ensure mechanical stability, but also have to guarantee a certain flexibility of the contacts in order to avoid all exaggerated mechanical stresses so as not to damage the silicon carbide sensor. This is the reason why such F shapes as well as the shape of the metal plate 421 are proposed.

Figures 3A, 3B:
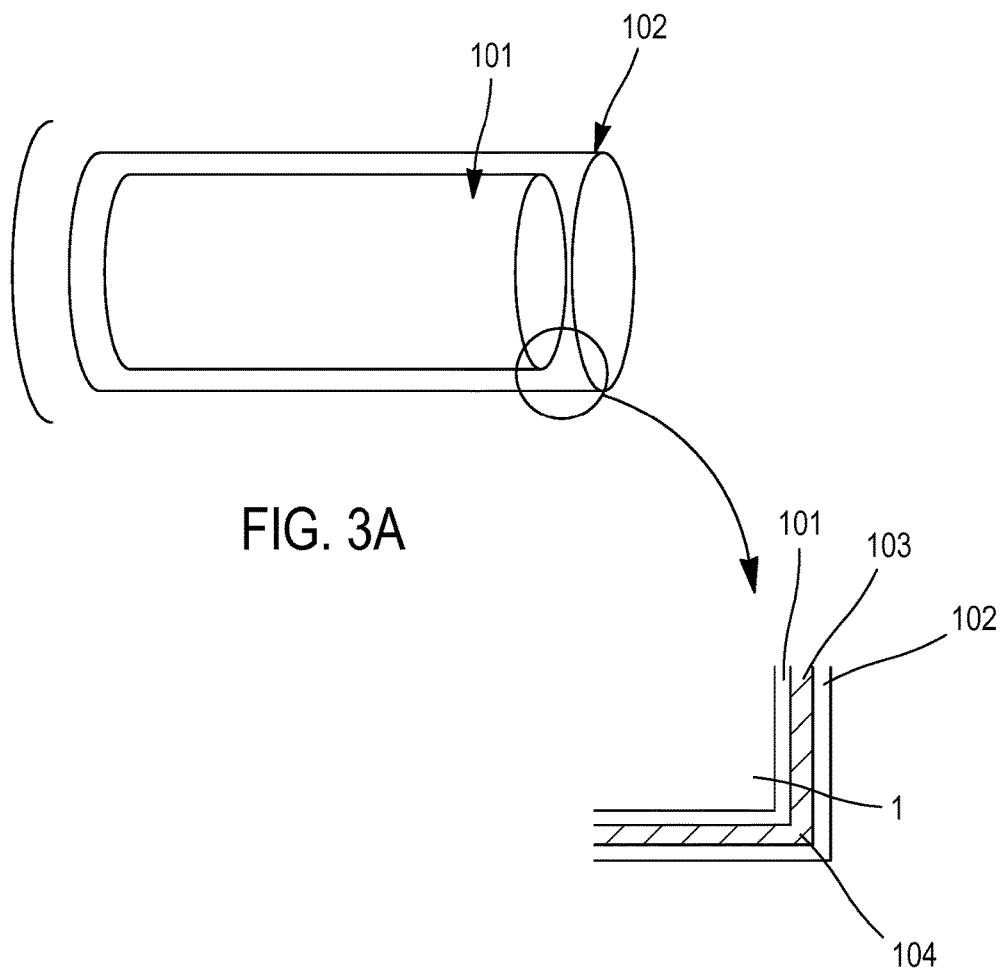
FIG. 3A, a schematic view of a detection system according to one embodiment of the invention and FIG. 3B, an enlargement of the circled zone in FIG. 3A.

FIGS. 3A and 3B illustrate a housing (external view) with a system 10 comprising a detector 1, a first jacket 101 enveloping the detector (the latter is not visible in FIG. 3A), a second jacket 102 encompassing the first jacket 101 in such a way that a space 103 exists between the first jacket 101 and the second jacket 102. The space 103 comprises a layer 104 comprising a first metal, for example cadmium which is ductile at high temperature. The first jacket and the second jacket comprise ceramic in such a way as to ensure a thermal insulation role so that the metal layer does not melt, for example, at high temperature. This cadmium layer serves as particle filter.

Figure 4:
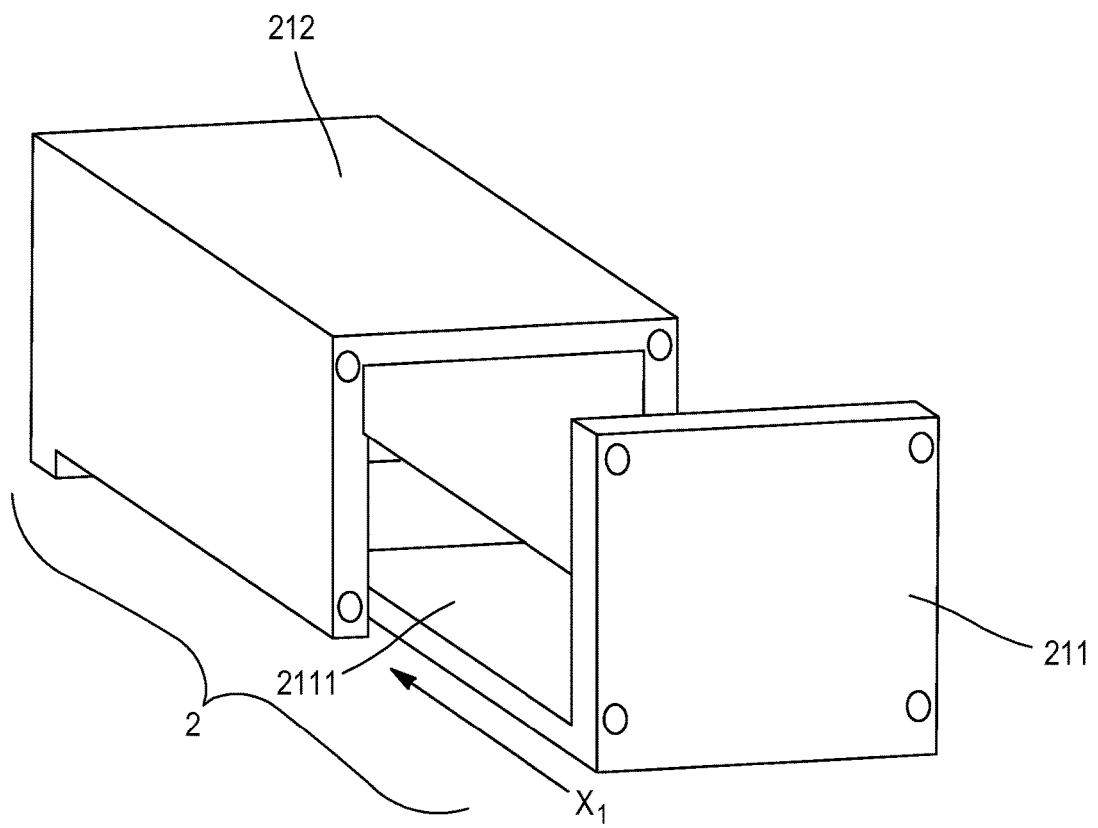
FIG. 4, a schematic view of a housing of a detector according to one embodiment of the invention.

FIG. 4 illustrates an exemplary embodiment of a housing 1. The housing 2 comprises a first portion 211 that can be inserted such as a drawer, by translation along a first axis X1, inside a second portion 212 of the housing. The first portion comprises a first base 2111 for receiving a sensor and its attachments (for example a sensor and its attachments as represented in FIGS. 1 and 2), in such a way that, when the first portion 211 of the housing is inserted inside the second portion 212 of the housing, the sensor is encapsulated in the housing 1.

Figure 5A:
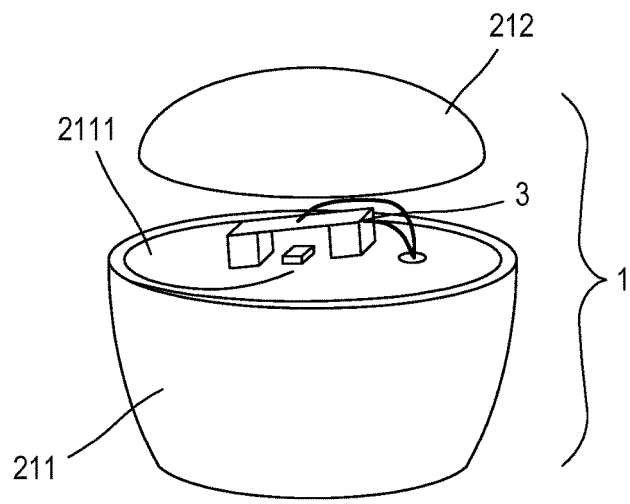
FIGS. 5A to 5C, a schematic view of different detectors according to different embodiments of the invention, FIG. 6, a schematic view of two detectors according to one embodiment of the invention, which can interconnect with each other.
Figure 5B:
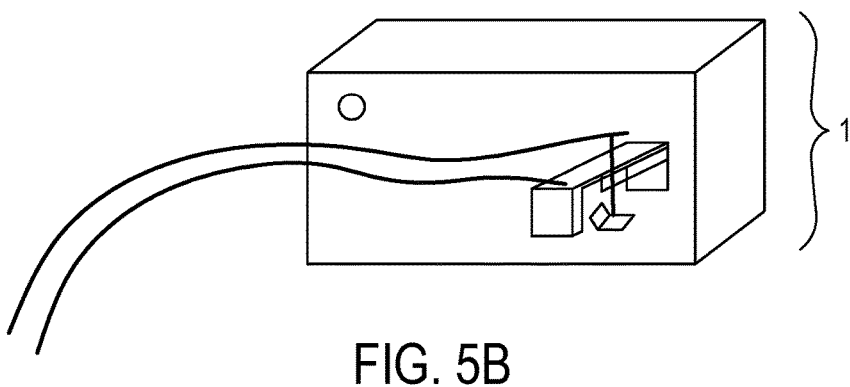
Figure 5C:
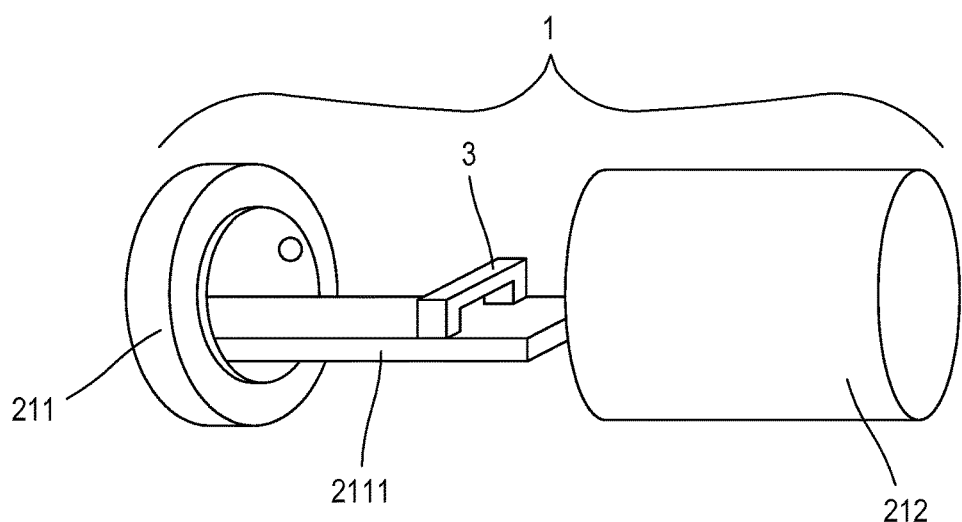

FIGS. 5A to 5C show different shapes of a detector 1.

The housing 2 of FIG. 5A has a spherical shape. In this spherical example, the housing 2 comprises a first portion 211 which can be screwed to a second portion 212 of the housing in such a way that the sensor 3 that is located on the support 2111 of the first portion 211 of the housing 2 is encapsulated in the housing.

The housing of FIG. 5B has a cubic shape, similar to the shape of the housing described in FIG. 4.

The housing of FIG. 5C has a cylindrical shape. In this cylindrical example, the housing 2 comprises a first portion 211 which can be screwed to a second portion 212 of the housing in such a way that the sensor on a base 2111 is encapsulated in the housing 2.

Figure 6:
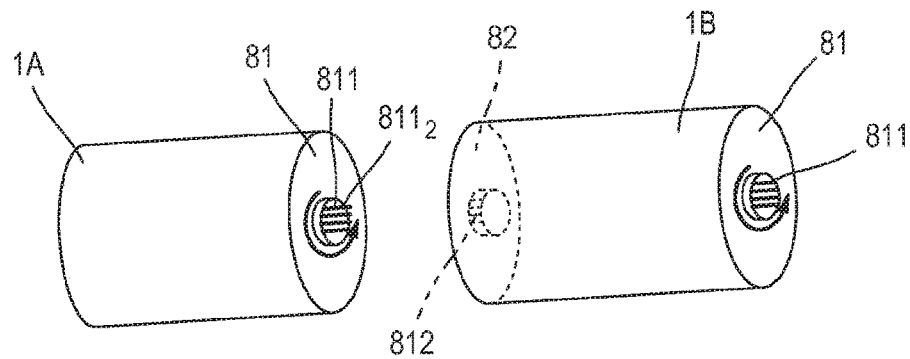

FIG. 6 represents an assembly for the detection of irradiated nuclear particles comprising a first detector 1A, a second detector 1B, both of cylindrical shape.

Each of the first 1A and second 1B detectors comprises:
- a first face 81 comprising at least one first male socket 811;
- a second face 82 comprising at least one first female socket 812.

The first male socket 811 of the first detector 1A comprises a first end (not visible) housed inside the housing and connected to the anode of the first detector and a second end 8112 adapted to cooperate with the second female socket 812 of the second detector 1B. Thus an electrical signal can circulate between the first detector 1A and the second detector 1B.

Figure 7A:
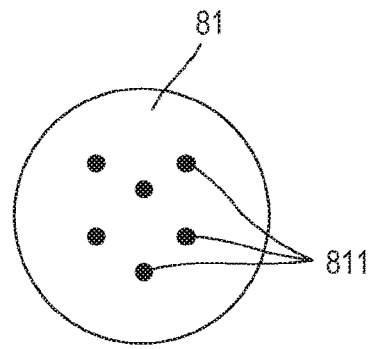
FIG. 7A, a front view of one face of a housing of a detector according to one embodiment of the invention and FIG. 7B, a front view of a second face of a housing of a detector according to one embodiment of the invention.
Figure 7B:
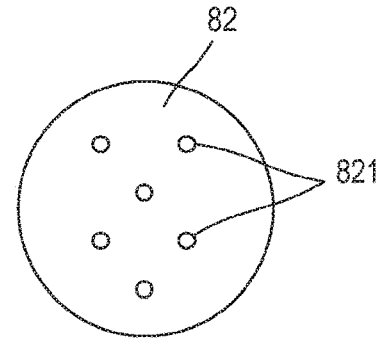

FIG. 7A represents a first face 81 of a detector comprising several male sockets 811 (several anodes) and a second face of a detector comprising several female sockets 812. As illustrated in FIG. 6, the first and second faces of a detector are opposite to each other. They can be positioned in a completely different manner in line or in column or in a cross (this strongly depends on the congestion linked to the number of pixels). The technical advantage of the presence of this plurality of male/female sockets will be better understood with reference to FIGS. 9A and 9B described hereafter.

Figure 8:
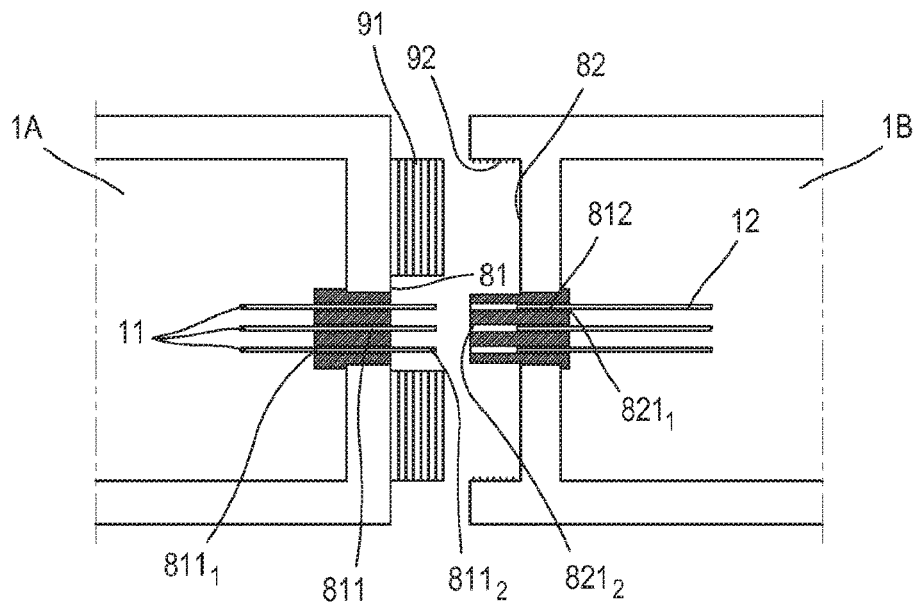
FIG. 8, a sectional View of the interconnection zone between one face of a first detector and a second face of a second detector according to one embodiment of the intention, FIG. 9A, a schematic view of an assembly for the detection of irradiated nuclear particles, said assembly comprising a plurality of detectors.

FIG. 8 represents an enlarged view of the possibility of interconnection between the first detector 1A of FIG. 6 and the second detector 1B of FIG. 6, which shows;
- the first face 81 of the housing of the first detector 1A comprising three male sockets 811. Each of these male sockets comprises a first end 8111 housed inside the housing connected to an anode 11 and a second end 8112 outside of the housing; the second face 82 of the housing of the second detector 1B comprising three female sockets 812. Each of these female sockets comprises a first end 8121 housed inside the housing connected to a cathode 11 and a second end 8212 outside of the housing.

The second end 8112 of the male sockets 811 of the first face 81 of the first detector 1A is adapted to be inserted inside the second end 8212 of the second face of the second detector 1B in such a way as to ensure an electrical connection between the first detector and the second detector.

The first face of the housing of the first detector comprises a first screw pitch 91 adapted to cooperate with a second threading 92 of the second detector.

Figure 9A:
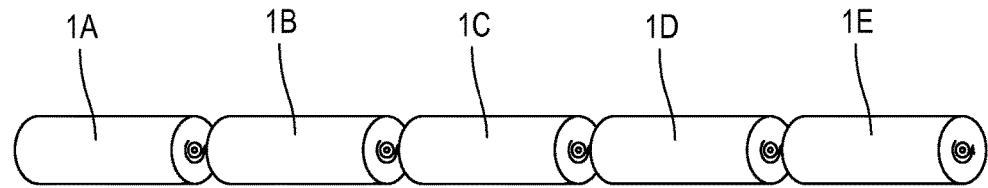
FIG. 9B, a schematic view of the electrical connections between the detectors of the plurality of detectors of the assembly of FIG. 9A.

FIG. 9A represents an assembly for the detection of irradiated nuclear particles comprising a plurality of detectors 1A, 1B, 1C, 1D, 1E, each of the detectors comprising a sensor. It should be noted that each of the detectors comprises several male/female sockets which are as numerous as there will be detectors in a system with their encapsulation. Each male/female socket corresponds to the anode of a detector of such an assembly. Such a system is referred to as a wagon system. It has the advantage of enabling the connection of several detectors, each detector being able to ensure a different function to the others on account for example of the gas inside the detector, the material constituting the detector, the type of sensor implanted in the detector, etc. It will also be possible to envisage the insertion of an electronic circuit inside one of these "wagons" which would collect all of these electrical signals corning from each anode and process them directly inside one of these encapsulations, referred to as "circuit-housing". It could also even be envisaged that one of these housings could be dedicated to the emission of these signals to the outside via a wireless connection, a housing referred to as "antenna-housing".

Figure 9B:
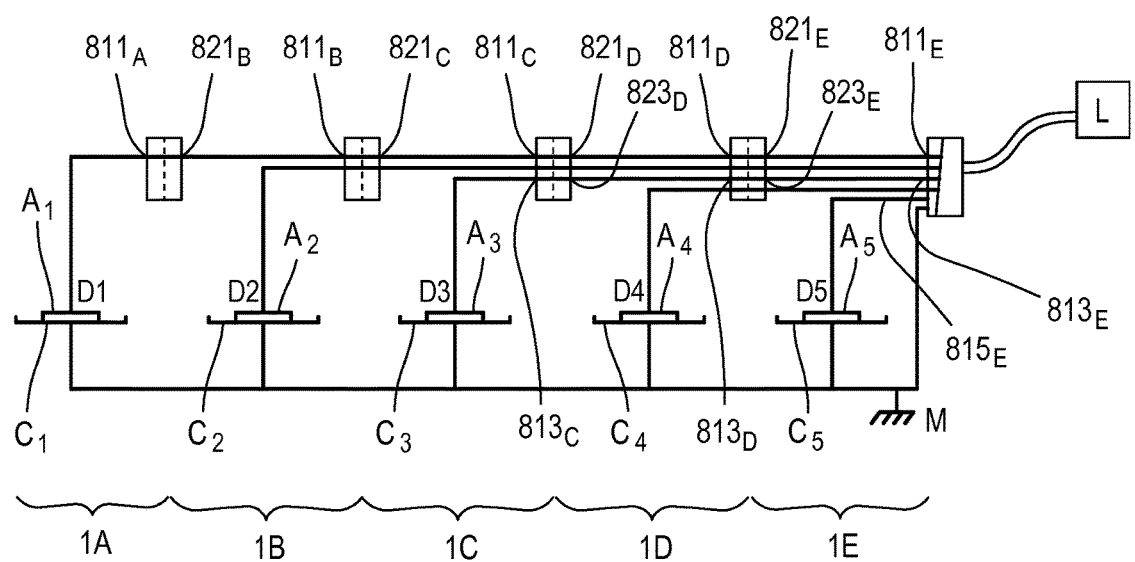

FIG. 9B represents the electrical connections between the different components of the different detectors, and notably between the different sensors, the latter being the source of the electrical information enabling the detection of particles. There are five sensors D1, D2, D3, D4 and D5 represented in FIG. 9B corresponding to the fine detectors 1A, 1B, 1C, 1D, 1E represented in FIG. 9A.

Each of the sensors comprises an anode $A_i$ and a cathode $C_i$, i being comprised between 1 and 5. The cathodes C1, C2, C3, C4 and C5 are connected to the housing of each of the detectors, the latter playing the role of ground M. This may be seen in the diagram of FIG. 9B, which represents all of the detectors once connected to each other and the grounds are interconnected. Indeed, the housings encapsulating the sensors of the detectors are interconnected and play the role of ground M to which the cathodes of the sensors are connected.

The anode A1 of the first detector is connected to a first male socket 811A of a first face of the first detector 1A. The first male socket 811A cooperates with the first female socket 821B of a first face of the second detector 1B. The first female socket 821B of the first face of the second detector 1B is connected to the first male socket 811B of the second face of the second detector 1B. The first male socket 811B of the second detector cooperates with the first female socket 821C of a first face of the third detector 1C. The first female socket 821C of the face of the second detector 1B is connected to the first male socket 811C of the second face of the third detector 1C, The first male socket 811C of the third detector cooperates with the first female socket 821D of a first face of the fourth detector 1D. The first female socket 8210 of the first face of the fourth detector 10 is connected to the first male socket 811D of the second face of the fourth detector 1D. The first male socket 8110 of the fourth detector 1D cooperates with the first female socket 821E of the first face of the fifth detector 1E. The first female socket 821E of the first face of the fifth detector 1E is connected to the first male socket 811E of the second face of the fifth detector 1E. The first male socket 811E of the fifth detector 1E is connected to a device for reading L electrical information having transited from the anode A1 of the first detector to the first male socket 811E of the fifth detector 1E and thus to the reading device. Thus, the information of the anode A1 of the first detector 1A has transited through all the detectors of the assembly that forms a wagon system.

Let us now take the anode A3 of the third sensor C3 of the third detector 1C. The anode A3 of the third detector 1C is connected to a third male socket 813C of the third detector 1C. The third male socket 813C of the third detector 1C cooperates with a third female socket 823D of the fourth detector 1D. The third female socket 823D of the fourth detector 10 is connected to a third male socket 813D of the fourth detector 1D. The third male socket 813D of the fourth detector 10 cooperates with a third female socket 823E of the fifth detector 1E. The third female socket 823E of the fifth detector 1E is connected to a third male socket 813E of the fifth detector 1D. The fifth male socket 811E of the fifth detector 1E is connected to the device for reading L electrical information having transited from the anode A3 of the third detector to the third male socket 813E of the fifth detector 1E and thus to the reading device. Thus, the information of the anode A3 of the third detector 1E has transited through the detectors of the assembly between the third detector and the final detector being connected to the reading device, thereby through a wagon system.

All the anodes of each of the five detectors are connected in the same way to the reading device L, or the "circuit-housing" for an "antenna-housing". Only the anode A5 of the fifth detector, i.e. of the final detector of the wagon system being connected to the reading device, is directly connected to the reading device by means of a fifth male socket 815E of the fifth detector 1E to which it is connected.

We can see here several male/female sockets which are as numerous as there will be detectors in a system with their encapsulation. Each male/female socket corresponds to the anode of a detector of an assembly comprising several detectors as described with reference to FIGS. 9A and 9B.

The invention is not restricted to the embodiments described previously with reference to the figures and alternatives could be envisaged without going beyond the scope of the invention.

The invention claimed is:

1. A radiation detector to be irradiated with nuclear particles, which comprises:
   an electrical connection system comprising an anode, and a cathode;
   a metal housing, inside of which at least one portion of said electrical connection system is positioned;
   a semi-conductor sensor comprising a first electrical circuit, said sensor being encapsulated in the housing; and
   an attachment system configured to attach the sensor to the housing, said attachment system comprising an electrically conductive material, at least one first portion of the attachment system being connected to the anode of the electrical connection system and being removably linked to said sensor, at least one second portion of the attachment system being connected to the cathode of the electrical connection system and being removably linked to said sensor and wherein the first portion of the attachment system comprises a moveable component.

2. The detector according to claim 1, wherein the first portion of the attachment system is linked in a removable manner to the anode of the electrical connection system and wherein the second portion of the attachment system is linked in a removable manner to the cathode of the electrical connection system.

3. The detector according to claim 1, wherein:
the second portion of the attachment system comprises a first metal support connected to the cathode, a first surface of the sensor being adapted to be in contact with a first surface of the first support, and
the moveable component of the first portion of the attachment system is between:
a first position, in which it exerts a mechanical pressure on a second surface of the sensor in such a way that the sensor is maintained in position between the first metal support and the moveable component; and
a second position, in which it does not exert mechanical pressure on the sensor.

4. The detector according to claim 3, wherein the first surface of the first support comprises a first bundle of short metal spikes and wherein the moveable component comprises a first portion, said first portion being adapted to be in contact with the second surface of the sensor in the first position of the moveable component, said first portion comprising a second bundle of short metal spikes.

5. The detector according to claim 3, wherein the first metal support is flexible.

6. The detector according to claim 1, further comprising a ceramic component, said ceramic component being arranged in the housing in such a way as to electrically insulate the anode from the cathode.

7. The detector according to claim 6, wherein the ceramic component is a ceramic ring arranged in the housing in such a way as to surround the first metal support.

8. The detector according to claim 1, wherein the housing comprises a first gas.

9. The detector according to claim 1, wherein the housing comprises:
a first face, said first face comprising at least one first male socket, said first male socket comprising a first end housed inside the housing and connected to the anode of said detector and a second end adapted to cooperate with a female socket of another additional detector that is complementary of the first male socket;
a second face, said second face comprising at least one first female socket, said first female socket comprising a first end housed inside the housing and connected to the first male socket of the first face of said detector and a second end adapted to cooperate with a male socket of another additional detector that is complementary of the first female socket.

10. An assembly for the detection of irradiated nuclear particles, said assembly comprising:
a first and a second detector each according to claim 1, said first detector comprising a first face comprising a first male socket, said first male socket comprising a first end housed inside the housing of the first detector and connected to the anode of said first detector and a second end adapted to cooperate with a first female socket of the second detector that is complementary of the first male socket of the first detector;
said second detector comprising:
a second face comprising a first female socket, said first female socket of the second detector comprising a first end housed inside the housing of the second detector and connected to a male socket of one face of said second detector and a second end adapted to cooperate with the male socket of the first detector;
a first face comprising:
a first male socket, said first male socket comprising one end housed inside the housing of the second detector and connected to the first female socket of the second face of said second detector and a second end adapted to cooperate with a first female socket of the second detector that is complementary of the first male socket;
a second male socket, said second male socket comprising a first end housed inside the housing and connected to the anode of said second detector and a second end adapted to cooperate with a female socket of a third detector that is complementary of the second male socket of the second detector.

11. An assembly according to claim 10, wherein the housing of the first detector comprises a first gas and the housing of the second detector comprises a second gas.

12. A system for the detection of irradiated nuclear particles, said system comprising:
a detector according to claim 1,
a first jacket comprising ceramic encompassing said detector,
a second jacket comprising ceramic encompassing said first jacket in such a way that a space exists between the first jacket and the second jacket, said space comprising a layer comprising a first metal.

13. The detector according to claim 1, wherein the semiconductor sensor is arranged between the at least one first portion of the attachment system and the at least one second portion of the attachment system.

14. The detector according to claim 1, wherein the moveable component includes a first part and a second part, the first and second part being configured to cooperate with each other so that (a) when the first part exerts a mechanical pressure on the sensor, the second part is disengaged with the first part and (b) when the first part does not exert a mechanical pressure on the sensor, the second part is engaged with the first part.

* * * * *